United States Patent
Braun et al.

(10) Patent No.: US 11,601,881 B2
(45) Date of Patent: Mar. 7, 2023

(54) CONTROL MONITORING UPON RECEIPT OF DISCONTINUOUS RECEPTION TRIGGER

(71) Applicant: NOKIA TECHNOLOGIES OY, Espoo (FI)

(72) Inventors: Volker Braun, Stuttgart (DE); Esa Tiirola, Kempele (FI); Karol Schober, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/764,202

(22) PCT Filed: Nov. 16, 2018

(86) PCT No.: PCT/US2018/061589
§ 371 (c)(1),
(2) Date: May 14, 2020

(87) PCT Pub. No.: WO2019/099880
PCT Pub. Date: May 23, 2019

(65) Prior Publication Data
US 2020/0367160 A1    Nov. 19, 2020

Related U.S. Application Data

(60) Provisional application No. 62/588,075, filed on Nov. 17, 2017.

(51) Int. Cl.
*H04W 52/02* (2009.01)
*H04W 76/28* (2018.01)
(Continued)

(52) U.S. Cl.
CPC ....... *H04W 52/0216* (2013.01); *H04W 24/08* (2013.01); *H04W 52/0229* (2013.01);
(Continued)

(58) Field of Classification Search
CPC . H04W 52/0216; H04W 76/28; H04W 24/08; H04W 52/0229; H04W 72/0493;
(Continued)

(56) References Cited

U.S. PATENT DOCUMENTS

2018/0279135 A1* 9/2018 Hwang ................. H04L 5/0094
2019/0098689 A1* 3/2019 Wei ....................... H04W 76/28
(Continued)

FOREIGN PATENT DOCUMENTS

WO    WO 2017/085358 A1    5/2017

OTHER PUBLICATIONS

3GPP TSG RAN WG1 Meeting AH_NR#3; R1-1716198, Source: MediaTek Inc., Title: Discussions on search space and Coreset designs, Nagoya, Japan, Sep. 18-21, 2017; (Year: 2017).*
3GPP TSG-RAN WG2 #98; R2-1704913, Source: InterDigital Inc., Title: C-DRX for Multiple Numerologies , Hangzhou, P.R. China, May 15-19, 2017. (Year: 2017).*
3GPP TSG RAN WG1 Meeting #90; R1-1712441, Source: ZTE, Title: NR-PDCCH Coreset Configuration ,Prague, Czechia Aug. 21-25, 2017. (Year: 2017).*
(Continued)

*Primary Examiner* — Mohammed S Chowdhury
(74) *Attorney, Agent, or Firm* — Squire Patton Boggs (US) LLP (57) ABSTRACT

Various communication systems may benefit from appropriate configuration of reception states. For example, certain wireless communication systems, such as new radio, may benefit from control monitoring upon receipt of a discontinuous reception trigger. A method can including receiving, by a user equipment, configuration of a search space set of a downlink control resource set with a first monitoring periodicity. The method can also include receiving a trigger or the user equipment becoming active after a period without physical downlink control channel (PDCCH) monitoring. The method can further include, after the receiving of the trigger or the becoming active, modifying a monitoring periodicity of the search space set to a second monitoring periodicity.

18 Claims, 5 Drawing Sheets

(51) Int. Cl.
  *H04W 24/08* (2009.01)
  *H04W 72/04* (2009.01)
  *H04W 80/08* (2009.01)

(52) U.S. Cl.
  CPC ....... *H04W 72/0493* (2013.01); *H04W 76/28* (2018.02); *H04W 80/08* (2013.01)

(58) Field of Classification Search
  CPC ... H04W 80/08; H04W 72/1289; Y02D 30/70
  See application file for complete search history.

(56) References Cited

U.S. PATENT DOCUMENTS

| | | | | |
|---|---|---|---|---|
| 2019/0306737 A1* | 10/2019 | Kwak | ................... | H04L 5/0053 |
| 2020/0036558 A1* | 1/2020 | Shen | ..................... | H04L 5/0053 |
| 2020/0107245 A1* | 4/2020 | Takeda | ................. | H04W 48/12 |
| 2020/0220703 A1* | 7/2020 | Kim | .................. | H04W 72/0493 |
| 2020/0245395 A1* | 7/2020 | Zhang | .................. | H04L 5/0053 |
| 2020/0367253 A1* | 11/2020 | Kim | ...................... | H04W 80/08 |
| 2020/0389847 A1* | 12/2020 | Deng | .................. | H04B 7/0617 |
| 2021/0153203 A1* | 5/2021 | Parkvall | ............ | H04W 72/1289 |

OTHER PUBLICATIONS

3GPP TSG RAN WG1 Meeting #90bis; R1-1718323, Source: MediaTek Inc., Title: Discussions on search space and Coreset designs, Prague, CZ, Oct. 9-13, 2017 (Year: 2017).*
GPP TSG RAN WG1 Meeting AH_NR#3; R1-1715395; Source: Huawei, HiSilicon; Title: Coreset configuration and search space design; Nagoya, Japan, Sep. 18-21, 2017 (Year: 2017).*
Examination Report issued in corresponding Indian Patent Application No. 202047025099 dated Mar. 30, 2021.
International Search Report and Written Opinion dated Feb. 11, 2019 corresponding to International Patent Application No. PCT/US2018/061589.
Mediatek Inc., "Discussion on Coreset configurations," 3GPP Draft; R1-1713675, 3GPP TSG RAN WG1 Meeting #90, Prague, Czech, Aug. 20, 2017, XP051316475.
Ericsson, "C-DRX timers," 3GPP Draft; R2-1711167, 3GPP TSG-RAN WG2 #99bis, Prague, Czech Republic, Oct. 8, 2017, XP051343175.
3rd Generation Partnership Project, Technical Specification Group Radio Access Network, "Evolved Universal Terrestrial Radio Access (E-UTRA), Medium Access Control (MAC) protocol specification (Release 14)", 3GPP TS 36.321, V14.4.0, Sep. 2017.

* cited by examiner

CONTROL MONITORING UPON RECEIPT OF DISCONTINUOUS RECEPTION TRIGGER

CROSS-REFERENCE TO RELATED APPLICATIONS:

This application claims priority from U.S. provisional patent application No. 62/588,075 filed on Nov. 17, 2017. The contents of this earlier filed application are hereby incorporated in their entirety.

BACKGROUND

Field

Various communication systems may benefit from appropriate configuration of reception states. For example, certain wireless communication systems, such as new radio, may benefit from control monitoring upon receipt of a discontinuous reception trigger.

Description of the Related Art

Discontinuous reception (DRX) procedure has the objective to reduce battery consumption of a user equipment (UE) by switching off the transmitter and receiver circuits during inactivity. DRX procedure is triggered after expiry of a timer (e.g. DRX Inactivity Timer of long term evolution (LTE)), where the timer is synchronized between a next generation Node B (gNB) or other base station and a UE. Alternatively, the DRX procedure is under control of the gNB by sending commands to the UE to activate the sleep mode, for example via a medium access control (MAC) control element of LTE.

SUMMARY

According to a first embodiment, a method can include receiving, by a user equipment, configuration of a search space set of a downlink control resource set with a first monitoring periodicity. The method can also include receiving a trigger or the user equipment becoming active after a period without physical downlink control channel (PDCCH) monitoring. The method can further include, after the receiving the trigger or the becoming active, modifying a monitoring periodicity of the search space set to a second monitoring periodicity.

In a variant, the first monitoring periodicity can be greater than the second monitoring periodicity.

In a variant, the discontinuous reception trigger can be received in a medium access control—control element or downlink control information or PHY layer signaling.

In a variant, the becoming active can be during an onDurationTimer period.

In a variant, the monitoring can include monitoring a plurality of search space sets with different periodicities from each other.

In a variant, the modifying can include modifying the monitoring periodicity of at least one of the search space sets.

In a variant, the modifying can include modifying according to predetermined rules.

In a variant, the predetermined rules can be signaled to the user equipment as part of a discontinuous reception command message or configured by higher layer signaling.

In a variant, the predetermined rules can be defined or configured separately for different search space sets.

In a variant, the modifying may be valid for a predetermined duration of time.

In a variant, the user equipment can modify monitoring periodicities of different search space sets based on characteristics of the discontinuous reception.

In a variant, the modifying can include monitoring a first search space set according to the monitoring periodicity of a second search space set.

In a variant, the modifying can include modifying the downlink control resource set and the search space set to correspond to a second downlink control resource set and second search space set having the second monitoring periodicity.

In a variant, the modifying can be the same or different based on whether the trigger is received or the user equipment becomes active after discontinuous reception.

In a variant, the modifying can further include configuring the time period T_DTX_over and/or T_DTX_trigger.

In a variant, the modifying can further include modifying a control resource set and corresponding search space to correspond to a control resource set According to a second embodiment, a method can include determining to apply a set of predetermined rules for monitoring a search space set of a downlink control resource set with a first monitoring periodicity. The method can also include configuring a user equipment with the set of rules.

The second embodiment may be configured to work together with the first embodiment, including any of the variants of the first embodiment.

According to third and fourth embodiments, an apparatus can include means for performing the method according to the first and second embodiments respectively, in any of their variants.

According to fifth and sixth embodiments, an apparatus can include at least one processor and at least one memory including computer program code. The at least one memory and the computer program code can be configured to, with the at least one processor, cause the apparatus at least to perform the method according to the first and second embodiments respectively, in any of their variants.

According to seventh and eighth embodiments, a computer program product may encode instructions for performing a process including the method according to the first and second embodiments respectively, in any of their variants.

According to ninth and tenth embodiments, a non-transitory computer readable medium may encode instructions that, when executed in hardware, perform a process including the method according to the first and second embodiments respectively, in any of their variants.

According to eleventh and twelfth embodiments, a system may include at least one apparatus according to the third or fifth embodiments in communication with at least one apparatus according to the fourth or sixth embodiments, respectively in any of their variants.

BRIEF DESCRIPTION OF THE DRAWINGS:

For proper understanding of the invention, reference should be made to the accompanying drawings, wherein.

DETAILED DESCRIPTION

As introduced above, DRX procedure may reduce battery consumption of a user equipment (UE) by switching off the transmitter and receiver circuits during inactivity. DRX procedure may be triggered after expiry of a timer, where the timer is synchronized between a next generation Node B (gNB) or other base station and a UE. Alternatively, the DRX procedure may be under control of the gNB, which can send commands to the UE to activate the sleep mode, for example via a medium access control (MAC) control element of LTE.

In LTE for DRX, the following parameters can be configured.

rx-Inactivity-Timer specifies the number of consecutive PDCCH-subframe(s) for which the UE should be active after successfully decoding a PDCCH indicating a new transmission, whether uplink (UL) or downlink (DL). This timer is restarted upon receiving PDCCH for a new transmission (UL or DL). Upon the expiry of this timer the UE should go to DRX mode.

shortDRX-Cycle is the first type of DRX cycle (if configured) that needs to be followed when UE enters DRX mode. This information element indicates the length of the short cycle in subframes, which include ON time followed by a possible OFF (inactivity) time.

drxShortCycleTimer is expressed as multiples of shortDRX-Cycle. The timer value can vary from 1 to 16 (short DRX cycles). This timer indicates the number of initial DRX cycles to follow the short DRX cycle before entering the long DRX cycle.

longDRX-CycleStartOffset defines long DRX cycle length as well as the DRX offset. DRX offset is used to calculate the starting subframe number for DRX cycle.

onDurationTimer specifies the number of consecutive PDCCH-subframe(s) at the beginning of each DRX Cycle (DRX ON). i.e., it is the number of subframes over which the UE shall read PDCCH during every DRX cycle before entering the power saving mode (DRX OFF).

HARQ RTT Timer specifies the minimum amount of subframe(s) duration from the time new transmission is received and before the UE can expect a retransmission of the same packet. This timer is fixed and not configured by RRC. For FDD the HARQ RTT Timer is set to 8 subframes. For TDD the HARQ RTT Timer is set to k+4 subframes, where k is the interval between the downlink transmission and the transmission of associated HARQ feedback.

drx-RetransmissionTimer indicates the maximum number of subframes for which UE should be monitoring PDCCH when a retransmission from the eNodeB is expected by the UE.

In addition to the above, an eNB may shorten the activity time by MAC-CE command For example, when the evolved Node B (eNodeB or eNB) does not have any more data to be sent to the UE, the eNB can transmit a DRX command MAC CE to the UE. Upon reception of DRX Command MAC CE, the UE enters short DRX cycle if configured, otherwise, the UE enters long DRX cycle.

In reality, the DRX Command MAC CE shortens UE's ON period. For example, if DRX Command MAC CE is received when either onDurationTimer or drx-Inactivity-Timer miming, the UE stops the timer and enters into DRX cycle (Short/Long).

The DRX Command MAC control element is identified by a MAC PDU subheader with LCID as 11110. It has a fixed size of zero bits.

Monitoring of the control channel in NR may be carried out by means of blind searches. Blind search or blind decoding may refer to the process by which a UE finds its physical downlink control channel (PDCCH) by monitoring a set of PDCCH candidates in every predefined monitoring occasion. During a PDCCH blind search, a UE may be monitoring predefined control channel elements (CCEs), aggregated CCEs and/or downlink control information (DCI) sizes in predefined time instants, corresponding to configured monitoring occasions. CCEs may be arranged within a predefined CORESET configured via higher layer signalling. Each CCE may include 6 resource element groups (REGs) (e.g., 12 subcarriers within 1 orthogonal frequency division multiplexed (OFDM) symbol), and 1, 2 or 3 REG bundles. REG bundles may be mapped into the CORESET either using interleaved or non-interleaved mapping. The UE may assume that REG bundle defines the precoder granularity in frequency and time used by gNB when transmitting PDCCH. CORESET resources may be configured in units of 6 resource blocks in the frequency.

Certain working assumptions and agreements have been made in 3GPP RAN1 working group meetings with respect to number of PDCCH blind decodings supported by UE. For example, in the case when only CORESET(s) for slot-based scheduling is configured for a UE, the maximum number of PDCCH blind decodes per slot per carrier is X, where the value of X does not exceed 44. It remains for further consideration as to the exact value of X, as for multiple active bandwidth parts (BWPs), for multiple transmission reception points (TRPs), for multiple carriers, for multi beams, for non-slot based scheduling, and as to numerology specific X In NR, in a given CORESET, two types of search spaces (for example UE-common search space and UE-specific search space) can have different periodicities for a UE to monitor. For physical downlink control channel (PDCCH) monitoring occasion of at least 5 different periodicities and slot-level offset value for PDCCH monitoring occasion are supported, periodicities can be at least 1-slot, 2-slot, other values such as [4-slot], [5-slot], [10-slot], and [20-slot] are currently under discussion. There could also be other values in the future. For N-slot monitoring occasion, the offset is one from [0, N−1]. Symbol-level bit-map of monitoring occasion within a slot is still available.

DRX procedure of LTE is specified in MAC specs (TS36.321). For NR, one set of the following parameters determines a set of search spaces: a set of aggregation levels, the number of PDCCH candidates for each aggregation level, and the PDCCH monitoring occasion for the set of search spaces.

The UE may be configured to monitor a search space set of a DL control resource set (CORESET) with a certain periodicity. The UE may be configured to monitor search space sets of multiple such CORESETs, possibly configured with different periodicities. For example, a UE can be configured to monitor a search space set of a first CORESET with 0.5 ms (e.g., 1 slot with 30 kHz SCS) periodicity for enhanced mobile broadband (eMBB) service and a search space set of a second CORESET with 5 ms (e.g., 10 slots with 30 kHz SCS) periodicity for machine type communication (MTC) service. There can be also search space sets which are monitored multiple times during a slot, for example two or seven times per slot. These monitoring occasions may be defined for non-slot based scheduling (mini-slots). An example service using non-slot based scheduling is Ultra Reliable Low Latency Communications (URLLC).

In a similar scenario, the same CORESET can be configured with multiple search space sets, the search space sets having different monitoring periodicities. For example, a user-specific search space set may have 0.5 ms periodicity and a user-common search space set may have 5 ms periodicity.

Certain embodiments address how to activate/deactivate DRX mode in the presence of multiple search space sets with different periodicities or in presence of a single search-space with large configured periodicity. In particular, certain embodiments provide for termination of pending retransmissions prior to the UE falling into sleep mode, or allow for short PDCCH monitoring period, when periodicity is large.

In certain embodiments, upon receipt of DRX trigger in MAC-CE, or after UE becomes active after DRX sleep (for example, during an onDurationTimer period), the UE can modify the monitoring periodicities of the one or more configured search space set(s) in a well-defined manner. The rules for how to modify the monitoring periodicities can be predefined, can be configured for example by higher layer signaling, or can be signaled to the UE as part of the DRX command message. The monitoring periodicities may not be impacted by an inactivity timer based DRX event, such as one related to rx-Inactivity-Timer. In certain embodiments, PDCCH rules can be defined, or configured, separately for different search space sets.

The nominal monitoring periodicity of a search space set can be periodicity A(SSS). The monitoring periodicity of the search space set when the UE has received the DRX trigger in MAC-CE and/or after UE becomes active after DRX sleep can be periodicity B(SSS). In a typical scenario periodicity, A(SSS)>periodicity B(SSS). Periodicity B can have a predefined transition period of duration T(SSS), during which it applies. This may be counted in terms of, for example, slots. It is possible to define periodicity B(SSS) and duration T(SSS) separately for the cases before DRX, and after DRX.

In certain embodiments, the UE can just modify the monitoring periodicities of different search space sets based on the DRX, as discussed above. The other parameters related to PDCCH monitoring, such as CORESET properties, aggregation levels, monitored DCI format(s) and the like are unchanged between operation under periodicity A(SSS) and periodicity B(SSS).

Figure 5:
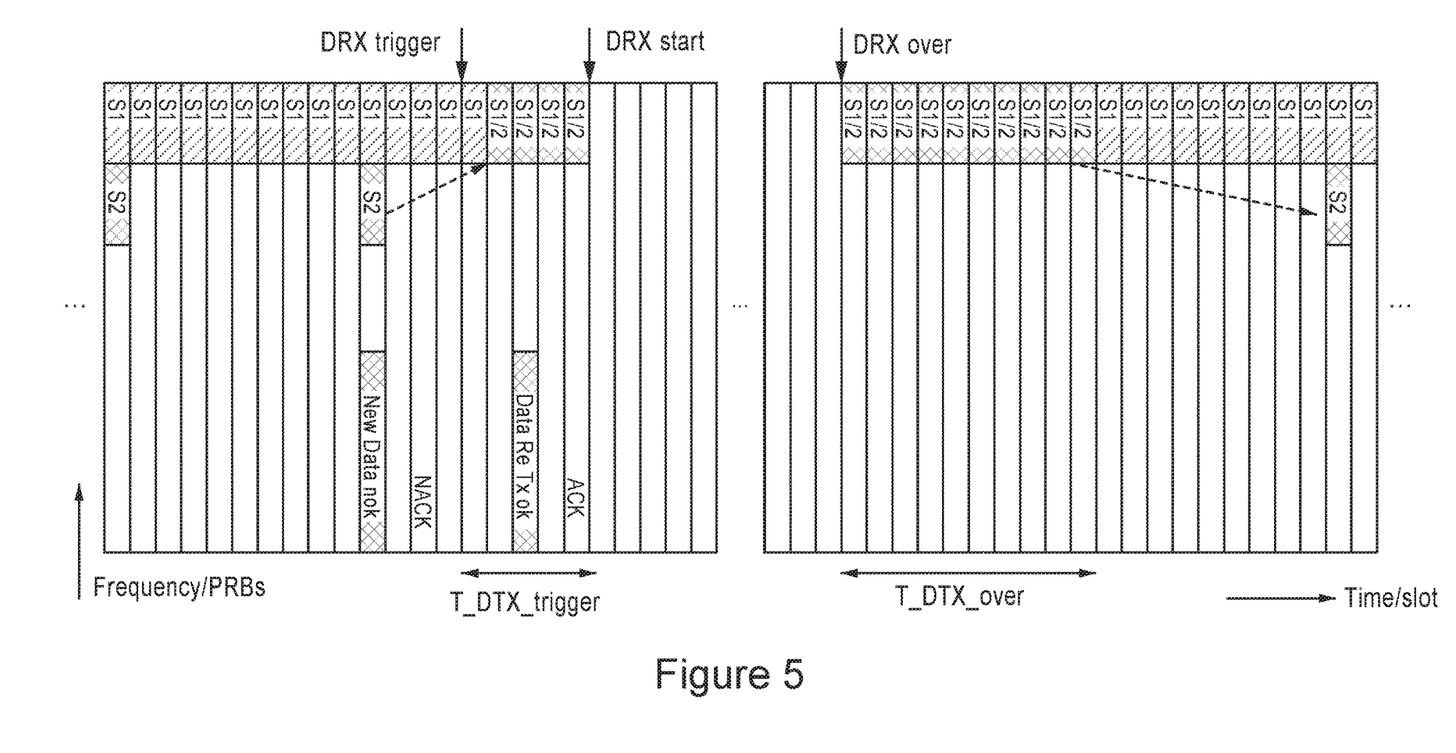
FIG. 5 illustrates a timing diagram in which a mapping to another CORESET and corresponding search space set is performed, according to certain embodiments.

In certain embodiments, additional PDCCH monitoring according to periodicity B(SSS) and corresponding DCI format(s) may be mapped also to other CORESETs and corresponding search space sets whenever available, as illustrated in FIG. 5. A benefit of this approach is that increased monitoring periodicity during periodicity B(SSS) could be made without increasing the CORESET overhead, if UEs are configured to rate-match around CORESETs.

In the example mentioned above, upon receiving the DRX trigger (such as the timer expired or close to expiry, or DRX command received from gNB), the UE may continue to apply a periodicity of 0.5 ms for the monitoring of the search space set of the first CORESET, while the search space set of the second CORESET may be monitored more frequently than every 5 ms. For example, the same periodicity of 0.5 ms may be applied for the monitoring of both search space sets.

An advantage of this method is that energy consumption of the UE may be reduced by shortening the time needed to complete pending HARQ retransmissions. This advantage also can apply for the UEs configured with only one search-space set with higher periodicities. Furthermore, certain embodiments of the method allow to concentration of the PDCCH monitoring occasions to the time instants where the UE has more need for data transmission/reception, such as after a UE becomes active after the DRX sleep. This approach may provide improved latency performance with reasonable PDCCH monitoring burden at average.

Figure 1:
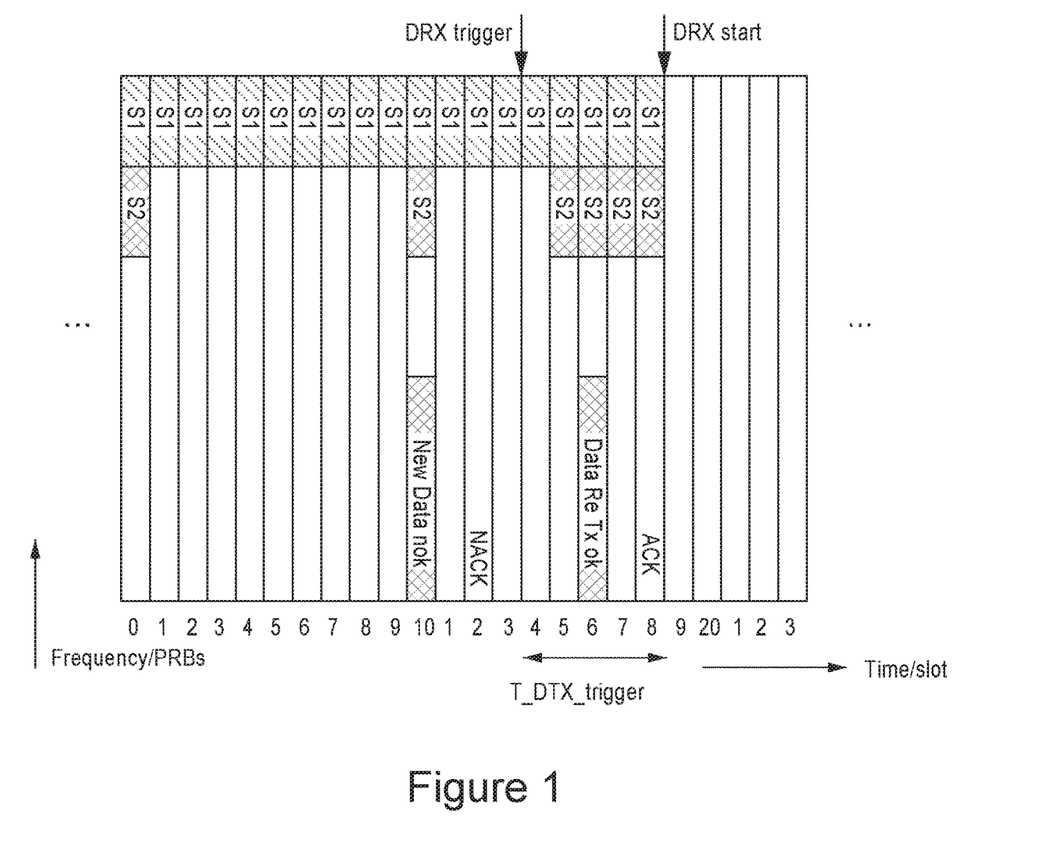
FIG. 1 illustrates a timing diagram for control monitoring and data reception, according to certain embodiments.

FIG. 1 illustrates a timing diagram for control monitoring and data reception, according to certain embodiments. More particularly, FIG. 1 illustrates a timing diagram for control monitoring and data reception in a frequency division duplex (FDD) DL case.

As shown in FIG. 1, the UE can monitor a first search space set S1 every slot, for example 0.5 ms (assuming 30 kHz subcarrier spacing), and a second search space set S2 every 10 slots, for example 5 ms. In this case, Periodicity A=10 slots.

In slot #10, the arrival of new data can be detected via the monitoring of S2. The DL data (denoted as New Data) may be incorrectly decoded (in the generic case, the data may relate to DL data transmitted on PDSCH, and/or UL data transmitted on PUSCH). The first retransmission of this data packet may be expected no earlier than slot #20 since S2 is monitored only every 5 ms.

In slot #12, the UE can report NACK to the gNB for the data packet incorrectly received in slot #10. In slot #14, the UE receives a DRX trigger and, with a certain delay, assumed as one slot in this example, adapts the monitoring periodicity of S2 to every 0.5 ms. Thus, Periodicity B=1 slot. Meanwhile the monitoring period of S1 remains unchanged.

In slot #16, the UE can detect the arrival of the pending retransmission via monitoring of S2. The decoding may be successful. In slot#18 ACK is reported to the gNB, indicating successful decoding of the packet first received in slot #10.

Since the pending retransmission is completed, the UE can fall into DRX sleep mode with a certain delay, assumed as zero in this example. The monitoring of S1 and S2 can be discontinued. The transition period T_DTX_trigger, in this example, was 5 slot. Thus, duration T=5 slots.

In the example of FIG. 1, the radio resources of search space sets S1 and S2 may be non-overlapping in the frequency-domain and/or time domain (CORESET location within the slot may vary according to configuration). However, the different search space sets can also use fully or partially overlapping radio resources. In the case of TDD, certain slots may be allocated to UL, these slots may not be taken into account.

The timing diagram example of FIG. 1 described slot-based scheduling, but similar principles can be applied also for non-slot based scheduling, such as symbol-based scheduling where the time axis is just different.

In case DRX is triggered from gNB, the DRX trigger can be conveyed using MAC-CE similar as in LTE. Alternatively, DRX can be triggered using another type of signaling, for example PHY-layer signaling involving DCI, possibly involving with HARQ-ACK feedback for the DCI.

Figure 2:
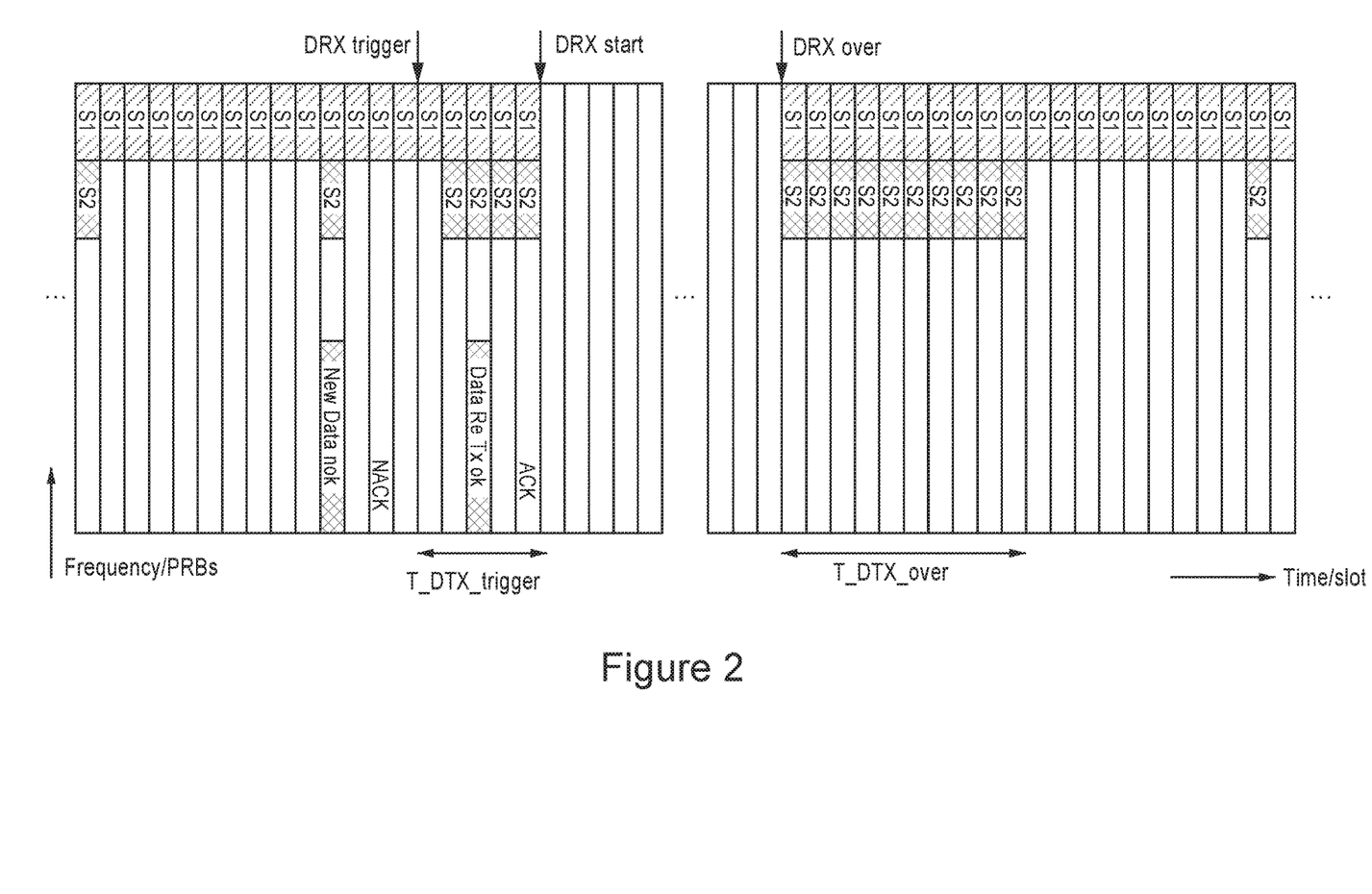
FIG. 2 illustrates a timing diagram with modified reporting periodicities also after discontinuous transmission is over, according to certain embodiments.

FIG. 2 illustrates a timing diagram with modified reporting periodicities also after discontinuous transmission is over, according to certain embodiments. As illustrated in FIG. 2, a similar principle can be applied when DTX is over and the UE returns to active state. In this case, the UE can start applying the modified monitoring periodicities, which may be more frequent periodicities according to this example, for a certain period of time, before falling back to the normal monitoring periodicities.

In the illustrated example, upon completion of DTX period, UE would resume the monitoring of the first and the second search space set with 0.5 ms periodicity, A=1 slot with 30 kHz sub-carrier spacing. The UE can then fall back after a certain time period T DTX over, for example after 5 ms, to the normal monitoring periodicities of 0.5 ms for the search space set of the first CORESET and 5 ms, namely periodicity B=10 slots, for the search space set of the second CORESET. In this way, more monitoring occasions can be provided when DTX period is over, thus reducing latencies to initiate new data transmissions. This approach would also allow for shortening the transition period, corresponding to onDurationTimer, to for example T=5 slots, when nominal periodicity A is 10 slots.

The monitoring periodicities applied upon receipt of DTX trigger and after DTX is over can be identical or be different, and can be configured, typically by higher layer signaling. Also the time period T_DTX_over may be configured. The T_DTX_trigger could be prolonged if still pending retransmission (re-tx).

FIG. 5 is similar to FIG. 2, except that further there is a further harmonization of the CORESETs and corresponding search spaces. Thus, in this way, overhead can be minimized, as mentioned above. As shown in FIG. 5, in case the two search-space sets S1 and S2 are configured in different CORESETs (#1 and #2) and UEs are configured to rate-match around CORESETs, to avoid increase of control overhead during the transmission period T, the search-space-set S2 in CORESET #2 can be mapped to CORESET #1, where search-space-set S1 is present.

Figure 3:
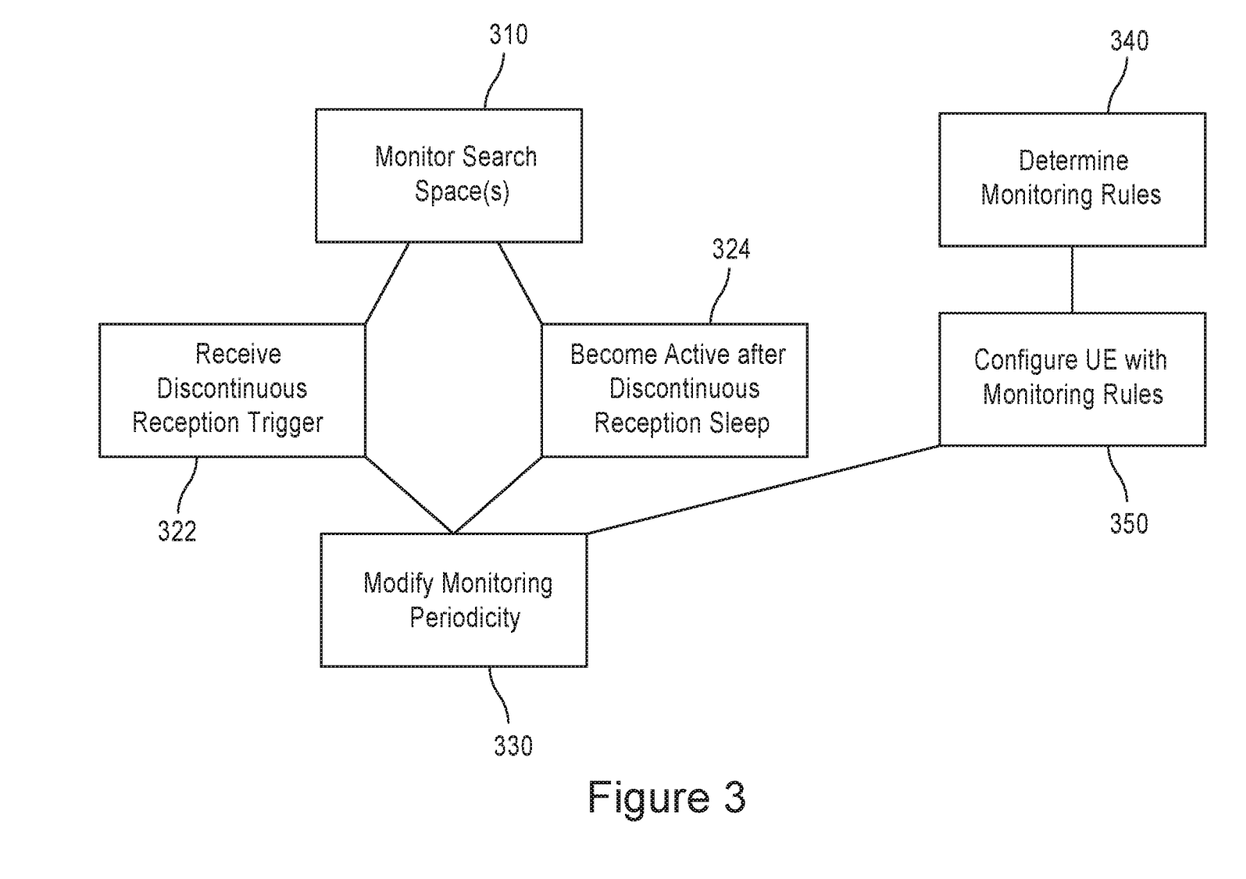
FIG. 3 illustrates a method according to certain embodiments.

FIG. 3 illustrates a method according to certain embodiments. As shown in FIG. 3, a method can include, at 310, monitoring, by a user equipment, a search space set of a downlink control resource set with a first monitoring periodicity. The monitoring can include monitoring a plurality of search space sets with different periodicities from each other.

The method can also include, at 322, receiving a discontinuous reception trigger or, at 324, the user equipment becoming active after a discontinuous reception sleep. The discontinuous reception trigger may be received in a medium access control-control element (MAC-CE) or in DCI. The becoming active may be during an onDuration-Timer period.

The method can further include, after the receiving the trigger or the becoming active, at 330 modifying a monitoring periodicity of the search space set. The modifying can include modifying the periodicity of at least one of the search space sets when there are a plurality of monitored search sets.

The modifying can be done according to predetermined rules. The predetermined rules can be signaled to the user equipment as part of a discontinuous reception command message or configured by higher layer signaling. The predetermined rules can be defined or configured separately for different search space sets. The user equipment can modify monitoring periodicities of different search space sets based on characteristics of the discontinuous reception.

The modifying can include monitoring a first search space set according to the monitoring periodicity of a second search space set, as illustrated in the above examples of using a monitoring periodicity of 0.5 ms (or 10 slots with 30 kHz SCS). The modifying can be the same or different based on whether the trigger is received or the user equipment becomes active after discontinuous reception. In other words, the rules may take into account the basis upon which the modifying is taking place. The modifying can further include configuring the time periods T_DTX_trigger and/or T_DTX_over.

The method can include, at 340, determining to apply a set of predetermined rules for monitoring a search space set of a downlink control resource set with a first monitoring periodicity. This determination may be performed by a network element, such as a gNB, identifying that the set of rules should be applied. The method can also include, at 350, configuring a user equipment with the set of rules. This may be done using radio resource control (RRC) signaling.

Figure 4:
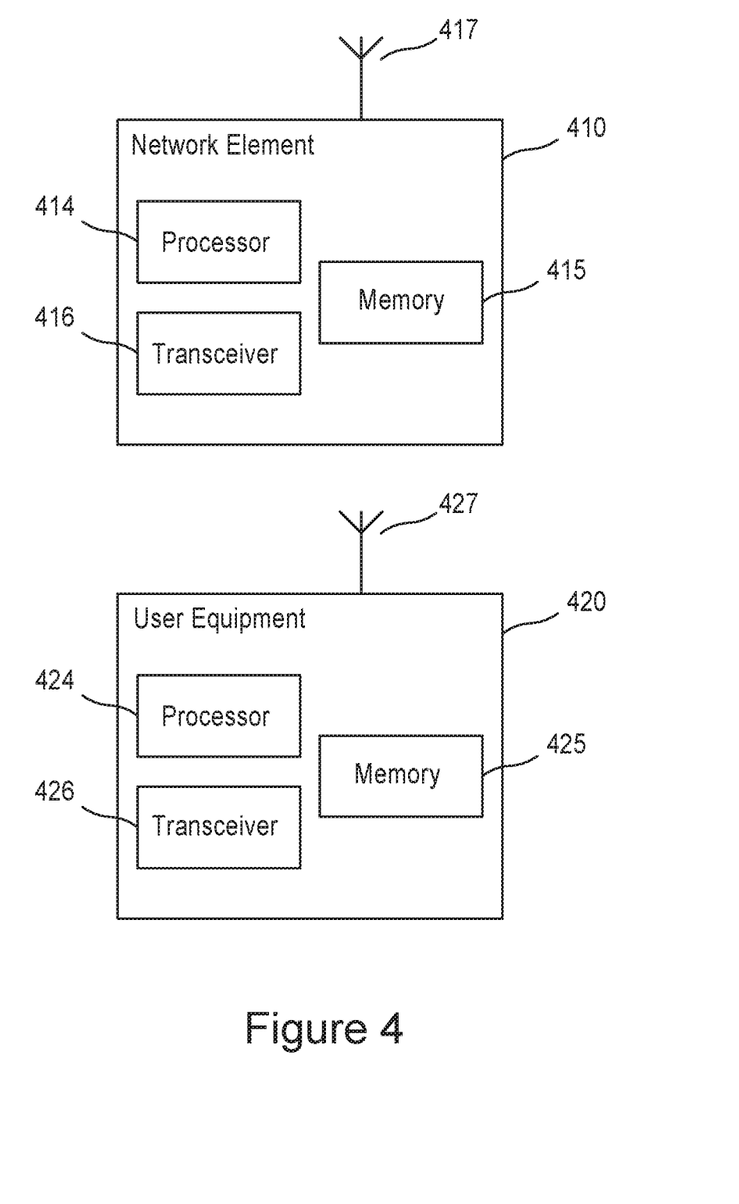
FIG. 4 illustrates a system according to certain embodiments.

FIG. 4 illustrates a system according to certain embodiments of the invention. It should be understood that each block of the flowchart of FIG. 3 may be implemented by various means or their combinations, such as hardware, software, firmware, one or more processors and/or circuitry. In one embodiment, a system may include several devices, such as, for example, network element 410 and user equipment (UE) or user device 420. The system may include more than one UE 420 and more than one network element 410, although only one of each is shown for the purposes of illustration.

A network element can be an access point, a base station, an eNode B (eNB), or any other network element, such as a gNB. Each of these devices may include at least one processor or control unit or module, respectively indicated as 414 and 424. At least one memory may be provided in each device, and indicated as 415 and 425, respectively. The memory may include computer program instructions or computer code contained therein, for example for carrying out the embodiments described above. One or more transceiver 416 and 426 may be provided, and each device may also include an antenna, respectively illustrated as 417 and 427. Although only one antenna each is shown, many antennas and multiple antenna elements may be provided to each of the devices.

Other configurations of these devices, for example, may be provided. For example, network element 410 and UE 420 may be additionally configured for wired communication, in addition to wireless communication, and in such a case antennas 417 and 427 may illustrate any form of communication hardware, without being limited to merely an antenna.

Transceivers 416 and 426 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner In other words, division of labor may vary case by case. One possible use is to make a network element to deliver local content. One or more functionalities may also be implemented as a virtual application that is provided as software that can run on a server.

A user device or user equipment 420 may be a mobile station (MS) such as a mobile phone or smart phone or multimedia device, a computer, such as a tablet, provided with wireless communication capabilities, personal data or digital assistant (PDA) provided with wireless communication capabilities, vehicle, portable media player, digital camera, pocket video camera, navigation unit provided with wireless communication capabilities or any combinations thereof. The user device or user equipment 420 may be a sensor or smart meter, or other device that may usually be configured for a single location.

In an exemplifying embodiment, an apparatus, such as a node or user device, may include means for carrying out embodiments described above in relation to FIG. 3.

Processors 414 and 424 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof. The term circuitry may refer to one or more electric or electronic circuits. The term processor may refer to circuitry, such as logic circuitry, that responds to and processes instructions that drive a computer.

For firmware or software, the implementation may include modules or units of at least one chip set (e.g., procedures, functions, and so on). Memories 415 and 425 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 410 and/or UE 420, to perform any of the processes described above (see, for example, FIG. 1). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 4 illustrates a system including a network element 410 and a UE 420, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Certain embodiments may have various benefits and/or advantages. For example, certain embodiments may speed up the activation of DRX sleep, thus reducing the UE's power consumption. Certain embodiments may allow for decreased latency when UE becomes active after sleep. Moreover, certain embodiments may enable a reduction of the duration of on-duration timer when nominal PDCCH monitoring periodicity A is large, thus reducing the UE's power consumption.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

List of Abbreviations

ACK Acknowledgment
CORESET Control resource set
CCE Control channel element
DCI Downlink control information
DL Downlink
DRX Discontinued reception
eMBB enhanced mobile broad band
gNB NR base station
FDD Frequency division duplex
HARQ Hybrid ARQ
LTE Long term evolution
MAC Medium Access Control
MTC Machine type communication
NACK Non Acknowledgement
NR New Radio
PDCCH Physical downlink control channel
RRC Radio Resource Control
SCS Sub-carrier spacing
TDD Time division duplex
UE User equipment
UL Uplink

We claim:

1. A method, comprising:
receiving, by a user equipment, configuration of a search space set of a downlink control resource set with a first monitoring periodicity;
receiving a trigger or the user equipment becoming active after a period without physical downlink control channel monitoring;
after the receiving of the trigger or the becoming active, modifying the first monitoring periodicity of the search space set to a second monitoring periodicity,
wherein the modifying comprises modifying, as part of a discontinuous reception procedure, the downlink control resource set and the search space set to correspond to a second downlink control resource set and second search space set having the second monitoring periodicity.

2. The method according to claim 1, wherein the first monitoring periodicity is greater than the second monitoring periodicity.

3. The method according to claim 1, wherein the receiving of the trigger comprises:
receiving a discontinuous reception trigger in a medium access control - control element or downlink control information of PHY layer signaling; or determining that the user equipment becomes active after a period without physical downlink control channel monitoring.

4. The method according to claim 1, wherein the becoming active is during an onDurationTimer period.

5. The method according to claim 1, wherein the receiving of the trigger or the user equipment becoming active comprises monitoring a plurality of search space sets with different periodicities from each other.

6. The method according to claim 1, wherein the modifying comprises modifying the first monitoring periodicity of at least one of a plurality of search space sets.

7. The method according to claim 1, wherein the modifying comprises modifying the first monitoring periodicity according to predetermined rules.

8. A computer program embodied on a non-transitory computer-readable medium, said program comprising program instructions stored thereon which, when executed in hardware, cause the hardware to perform at least the method according to claim 1.

9. An apparatus, comprising:
at least one processor; and
at least one memory comprising computer program code, the at least one memory and computer program code configured, with the at least one processor, to cause the apparatus at least to
receive configuration of a search space set of a downlink control resource set with a first monitoring periodicity;
receive a trigger or become active after a period without physical downlink control channel monitoring; and
after the receiving of the trigger or the becoming active, modify the first monitoring periodicity of the search space set to a second monitoring periodicity,
wherein the modifying comprises modifying, as part of a discontinuous reception procedure, the downlink control resource set and the search space set to correspond to a second downlink control resource set and second search space set having the second monitoring periodicity.

10. The apparatus according to claim 9, wherein the first monitoring periodicity is greater than the second monitoring periodicity.

11. The apparatus according to claim 9, wherein the at least one memory and computer program code further configured, with the at least one processor, to cause the apparatus at least to:
receive a discontinuous reception trigger in a medium access control - control element or downlink control information of PHY layer signaling; or
determine that the apparatus becomes active after a period without physical downlink control channel monitoring.

12. The apparatus according to claim 9, wherein the becoming active is during an onDurationTimer period.

13. The apparatus according to claim 9, wherein the at least one memory and computer program code further configured, with the at least one processor, to cause the apparatus at least to monitor a plurality of search space sets with different periodicities from each other.

14. The apparatus according to claim 9, wherein the at least one memory and computer program code further configured, with the at least one processor, to cause the apparatus at least to modify the first monitoring periodicity of at least one of a plurality of search space sets.

15. The apparatus according to claim 9, wherein the at least one memory and computer program code further configured, with the at least one processor, to cause the apparatus at least to modify the first monitoring periodicity according to predetermined rules.

16. The apparatus according to claim 15, wherein the predetermined rules are signaled to the apparatus as part of a discontinuous reception command message or configured by higher layer signaling.

17. A method, comprising:
determining to apply a set of predetermined rules for monitoring a search space set of a downlink control resource set with a first monitoring periodicity;
configuring a user equipment with the set of predetermined rules;
transmitting a trigger or indicating the user equipment becoming active after a period without physical downlink control channel monitoring; and
transmitting at least one physical downlink control channel for the user equipment using resources defined by the search space set of the downlink control resource set and a second monitoring periodicity,
wherein the predetermined rules, upon the trigger being received or the user equipment becoming active after the period, are configured to cause the user equipment to modify, as part of a discontinuous reception procedure, the downlink control resource set and the search space set to correspond to a second downlink control resource set and second search space set having the second monitoring periodicity.

18. An apparatus, comprising:
at least one processor; and
at least one memory comprising computer program code, the at least one memory and computer program code configured, with the at least one processor, to cause the apparatus at least to
determine to apply a set of predetermined rules for monitoring a search space set of a downlink control resource set with a first monitoring periodicity;
configure a user equipment with the set of predetermined rules;
transmit a trigger or indicating the user equipment becoming active after a period without physical downlink control channel monitoring; and
transmit at least one physical downlink control channel for the user equipment using resources defined by the search space set of the downlink control resource set and a second monitoring periodicity,
wherein the predetermined rules, upon the trigger being received or the user equipment becoming active after the period, are configured to cause the user equipment to modify, as part of a discontinuous reception procedure, the downlink control resource set and the search space set to correspond to a second downlink control resource set and second search space set having the second monitoring periodicity.

* * * * *